United States Patent [19]

Wilkens

[11] 4,075,606

[45] Feb. 21, 1978

[54] SELF-MEMORIZING DATA BUS SYSTEM FOR RANDOM ACCESS DATA TRANSFER

[75] Inventor: Richard W. Wilkens, Largo, Fla.

[73] Assignee: E-Systems, Inc., Dallas, Tex.

[21] Appl. No.: 657,828

[22] Filed: Feb. 13, 1976

[51] Int. Cl.² .................. G11C 11/40; H04Q 9/00
[52] U.S. Cl. .................... 340/147 B; 307/238; 365/189; 365/230
[58] Field of Search ........ 340/166 FE, 147 R, 173 R, 340/173 SP, 166 R, 173 DR, 147 C, 147 B; 307/238, 208; 333/7 R

[56] References Cited

U.S. PATENT DOCUMENTS

| | | | |
|---|---|---|---|
| 3,402,392 | 9/1968 | Schroeder | 340/166 R |
| 3,651,467 | 3/1972 | Dejean et al. | 340/166 R |
| 3,818,463 | 6/1974 | Grundy | 307/238 X |
| 3,922,650 | 11/1975 | Schaffer | 340/173 R |
| 3,959,781 | 5/1976 | Mehta et al. | 340/173 R |
| 3,964,031 | 6/1976 | Eaton, Jr. | 340/173 R |
| 4,024,512 | 5/1977 | Amelio et al. | 340/173 DR |

Primary Examiner—Donald J. Yusko
Attorney, Agent, or Firm—Robert V. Wilder

[57] ABSTRACT

A data bus system is disclosed for transferring data from one process area to another without synchronizing bus input and output functions. Data is driven onto the bus when available. When data is not being actively driven onto the bus, the bus will latch to its last driven state. The data may then be randomly accessed.

6 Claims, 1 Drawing Figure

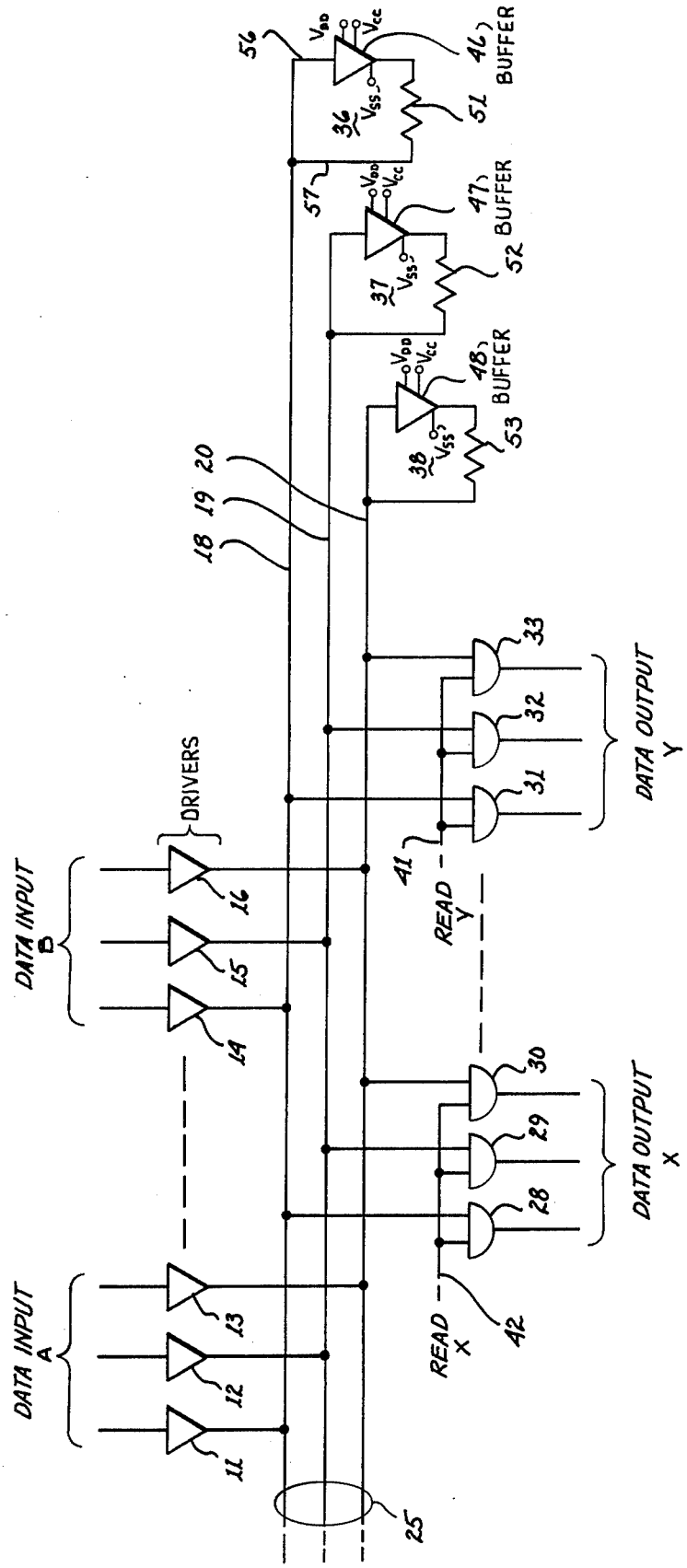

SELF-MEMORIZING DATA BUS SYSTEM FOR RANDOM ACCESS DATA TRANSFER

BACKGROUND OF THE INVENTION

This invention relates to data bus systems, and more particularly, to data bus systems where multiple data input parts and multiple data output parts are required on a single bus.

DISCUSSION OF THE PRIOR ART

Traditional logic systems generate data bits at a variety of process areas. The data is utilized by a variety of data output areas. The various data output areas and data input areas are interconnected by conductive buses. Data may be placed onto the bus at any of the various input process areas and read off the bus at any of the various data output areas. Because it is essential not only to be able to access the data on the bus, but also to know the process area that generated the data, such systems must be able to correlate the process area location with the data. Prior art logic systems have utilized two basic approaches to the problem.

A first approach has been to synchronize the input of information to the data bus with the accessing of output data stored in the bus. This system, the so-called strobe system, utilizes a series of strobe pulses to enable the input and output functions associated with the transfer of data along the bus. Not only is it necessary in these systems to provide the extensive strobe functions, but also such systems are limited since each component of the system must operate with timing compatible with every other element of the system. Since each element of the synchronous system operates under the control of the same strobe arrangement, it is impossible to operate elements of such a system at incompatible rates even if that rate is optimum for the particular element.

A second approach to the problem utilizes a so-called random access system in which data generating functions and data access facilities operate independently of each other. To allow for compatibility between the generated data and the need for that data, registers and other storage devices are dedicated to the various input and output functions. That is, although data may be generated at any time, that data must be stored until the random access data output has use for the stored data. This dedicated storage may be either associated with a particular data generating process area, or is may be associated with a particular data utilizing output. Since provision is made for storing the data between the time it is generated and utilized, the necessity for synchronizing all functions in such a system is obviated. However, the necessity for providing dedicated storage to make the various components of the system compatible with each other substantially increases the size, complexity and cost of such logic systems.

OBJECTS OF THE PRESENT INVENTION

It is therefore an object of the present invention to provide a bus-oriented logic system having a non-synchronous relationship between data input to the bus and data access from the bus.

It is another object of the present invention to provide a data bus for use in a logic system having random access without the need for dedicated storage.

It is also an object of the present invention to provide a data bus providing the capacity to latch at the last driven state of the bus.

It is yet another object of the present invention to provide a data bus for a logic system in which the state of information on the bus may be maintained without continuously driving the bus.

SUMMARY OF THE INVENTION

In accordance with the preferred embodiment of the present invention, a data bus system is disclosed for permitting demand access to data randomly inserted onto the bus. A semiconductor buffer with a resistor feedback is connected to each data line of the data bus. When the bus is driven, the buffer follows the bus state and provides a corresponding output level. When the bus is not being driven, the buffer output controls both the state of the bus and the state of the input to the buffer through the feedback loop connection. This allows the buffer to latch at, or memorize, its last driven state and permits access to the bus at any time without the necessity for synchronous operation or dedicated storage.

BRIEF DESCRIPTION OF THE DRAWING

The drawing is a schematic view of a data bus system in accordance with the present invention.

DETAILED DESCRIPTION OF THE ILLUSTRATIVE EMBODIMENT

The drawing shows a data bus system in schematic form which includes a plurality of data inputs, represented by data input A and data input B in the drawing. Data input A includes shaper/drivers 11, 12 and 13 while data input B includes shaper/drivers 14, 15 and 16 which connect to a source of data information and to one conductor of the three conductors 18, 19 and 20 which make up the data bus 25. A plurality of data outputs, represented in the drawing by data output X and data output Y, also connect to the data bus 25. A plurality of output gates 28, 29 and 30 associated with data output X and a plurality of output gates 31, 32 and 33 associated with data output Y connect to conductors 18, 19 and 20 of data bus 25. Conductors 18, 19 and 20 also connect respectively to buffer circuits 36, 37 and 38 whose function will be explained later in detail.

For descriptive purposes, it will be assumed that input data is available for insertion on data bus 25 at the data input A. Shaper/drivers 11, 12 and 13 connect respectively to conductors 18, 19 and 20 of data bus 25. In response to the data information, shaper/drivers 11, 12 and 13 drive conductors 18, 19 and 20 to electrical states which correspond to the data signal levels appearing at their respective inputs. Since data input A has no dedicated storage associated with it, as soon as the input data is available, it will be placed onto the bus 25.

Again, for purposes of illustration, it will be assumed that data is read out of data bus 25 via data output Y. Data output Y is derived from the output leads of output gates 31, 32 and 33 which have their inputs connected respectively to conductors 18, 19 and 20 of data bus 25. In order to read data from the conductors of data bus 25 to data output Y, gates 31, 32 and 33 are enabled by an enabling signal applied to lead 41 when a demand for the data occurs and representing the read Y condition. A similar but distinct and separate signal, the read X signal, is applied to lead 42 to read information from gates 28, 29 and 30. Gates 31, 32, and 33 associated with data output Y do not require dedicated storage for their operation as will be explained later.

Because dedicated storage is not provided in association with either data input A or data output Y, the conventional system approach would require a clocking circuit to synchronize the input data information from shaper/drivers 11, 12 and 13 with data output information from gates 31, 32 and 33. In the absence of such a clocking arrangement, the inputs and outputs would be out of synchronization with the result that no data information signals might be present on conductors 18, 19 and 20 when read Y signal is applied to the enabling lead 41 associated with output gates 31, 32 and 33. In order to permit information to be placed onto bus 25 when it is available and to be retrieved from the bus on demand without the necessity for maintaining clocked synchronization for continuous monitoring and control of bus 25, the system in accordance with the present invention includes buffer circuits 36, 37 and 38 connected to conductors 18, 19 and 20, respectively.

Circuit 36 is typical and includes a complementary metal-oxide-semiconductor (generally identified by the term "CMOS") buffer element 46. Buffer elements 47 and 48 connect similarly in circuits 37 and 38. Buffer element 46 is a non-inverting, high input impedance device which connects in series with a resistor 51. Buffer elements 47 and 48 in circuits 37 and 38 are similarly connected in series with resistors 52 and 53, respectively. For example, the buffer elements 46, 47 and 48 could be RCA devices, types CD 4050 or CD 4010. Such devices handle both binary and tristate data information. The binary signal levels are "1" or "0", while the tristate signals include "1", "0" and a high impedance "open input" when no other signal is present. Although the operation of the system will be described with reference to conductor 18 and its associated buffer circuit 36, it should be clearly understood that conductors 19 and 20 and their associated buffer circuits 37 and 38 function in a similar manner.

OPERATION OF THE SYSTEM

When data input information is available at data input A, shaper/driver 11 drives conductor 18 to an electrical state corresponding to the data input information. Shaper/driver 11 has three specific output states, representing what is commonly referred to as a "tristate mode". These states include "logic 1" and "logic 0" states in which the input data lead from data input A plus the presence of an enabling signal (the enabling lead is not shown but is well known in the art) produces an output signal corresponding to the data input level. The third state of shaper/driver 11 is a high impedance state which applies no voltage to the output and produces no output logic signal. Conductor 18 will be maintained at the output signal level of shaper/driver 11. If output gate 31 were not enabled by a signal on lead 41 to read out that data information during the time that conductor 18 was being driven, that information would ordinarily be lost. However, in accordance with the present invention conductor 18 connects to buffer circuit 36 which includes an input lead 56 connected to CMOS buffer element 46 through series resistor 51 to an output lead 57 which connects both to conductor 18 and to input lead 56. By connecting output lead 57 to input lead 56, a feedbck loop arrangement is provided for circuit 36.

Since element 46 is a non-inverting device, the signal appearing on output lead 57 provides the input at lead 56, thereby maintaining element 46 at its driven state when data signal information is removed from conductor 18. Thus, if data information is placed on conductor 18 by shaper/driver 11 prior to a demand for that information an output gate 31, even though the drive signal is no longer present on conductor 18, the feedback loop arrangement of circuit 36 will maintain conductor 18 at the signal state to which it was last driven. With no logic level signal appearing at its output, shaper/driver 11 is at its high impedance state. Since shaper/driver 11 applies no voltage to conductor 18 that would influence the bus signal level, circuit 36 controls the bus signal level solely via the feedback loop. Thus, circuit 36 will "remember" the last driven state of conductor 18 and will provide that information to data output Y whenever output gate 31 is enabled.

Various modifications to the disclosed embodiment could be made by those skilled in the art without departing from the spirit and scope of the present invention. For example, if it is desired to use bipolar logic and standard TTL gates, only nominal modifications to the system would be necessary. Input impedance must remain high, and a logic switching point of approximately 50% utilized. Although standard TTL gates do not have high high input impedance characteristics, their properties could be easily controlled by the buffer design. Such non-inverting devices could then control themselves in accordance with the present invention.

What is claimed is:
1. In a data bus system, the combination comprising:
 a. a bus conductor for transferring electrical signals:
 b. at least one input device connected to said bus for generating multi-state electrical signals indicative of data information;
 c. at least one output device connected to said bus conductor, said output device being operable, at random, to read said electrical signals from said bus conductor; and
 d. at least one non-inverting buffer having an input lead and an output lead, said input and said output leads being connected together to form a feedback loop and to said bus conductor to permit said buffer to be driven by said input device and to latch said buffer at the state of the last generated of said electrical signals when said buffer is not driven by said input device.

2. The combination as set forth in claim 1 wherein said buffer comprises:
 a. a CMOS device connected to said bus conductor; and
 b. a resistor connected in series with said CMOS device between said input and said output leads of said buffer.

3. In a data bus system, the combination comprising:
 a. a conductive bus;
 b. input means connected to said bus for intermittently writing data information onto said bus by driving said bus in a plurality of electrical states each indicative of data information;
 c. output means connected to said bus, said output means being selectively operable to read said data information off said bus at random; and
 d. buffer means connected to said bus for remembering the last driven state of said bus when said bus is not being driven by said input means.

4. In a data bus system in accordance with claim 3, the combination wherein said buffer means includes:
 a. a non-inverting device having an input lead and an output lead, said input lead and said output lead being connected to each other to form a feedback loop; and b. signal control means for controlling the relationship between said input lead and said output lead.

5. In a data bus system in accordance with Claim 4, wherein:

a. said non-inverting device is a CMOS device; and b. said signal control means is a resistor connected in series with said CMOS device and connecting between said input lead and said output lead.

6. In a data bus system, the combination comprising:

a. a bus conductor;

b. a plurality of data inputs, each of said data inputs including:
   i. means for selectively and intermittently generating a plurality of electrical signals corresponding to data information; and
   ii. a plurality of drivers, each of said drivers being connected to said conductor for intermittently driving said conductor to an electrical state representing one of said electrical signals;

c. a plurality of data outputs, each of said outputs being connected to said conductor for reading out at random the state of said conductor and producing an output signal indicative of the data information represented thereby; and d. a buffer connected to said conductor for maintaining said conductor at its last driven state, said buffer including:
   i. an input lead connected to said conductor;
   ii. a non-inverting CMOS device connected to said input lead;
   iii. a resistor connected in series with said CMOS device; and
   iv. an output lead connecting said resistor to said input lead to form a feedback loop for said buffer.

* * * * *